United States Patent [19]

Lambert

[11] Patent Number: 5,345,918
[45] Date of Patent: Sep. 13, 1994

[54] FUEL SYSTEM AND CONSTANT GAS PRESSURE GOVERNOR FOR A SINGLE-CYLINDER, FOUR-STROKE CYCLE ENGINE

[75] Inventor: John E. Lambert, Dublin, Ohio

[73] Assignee: Gas Research Institute, Chicago, Ill.

[21] Appl. No.: 36,535

[22] Filed: Mar. 19, 1993

Related U.S. Application Data

[63] Continuation-in-part of Ser. No. 911,960, Jul. 10, 1992, abandoned.

[51] Int. Cl.[5] .......................................... F02M 21/04
[52] U.S. Cl. .................................................. 123/527
[58] Field of Search ............... 123/DIG. 12, 525, 527; 48/184

[56] References Cited

U.S. PATENT DOCUMENTS

| 2,346,763 | 4/1944 | Jones | 123/527 |
|---|---|---|---|
| 2,398,878 | 4/1946 | Bolli | 123/140 |
| 2,409,611 | 10/1946 | Bodine | 123/121 |
| 2,410,773 | 11/1946 | Chandler | 123/140 |
| 2,420,562 | 5/1947 | Rathbun | 123/527 |
| 2,563,228 | 8/1951 | Ensign | 123/527 |
| 2,606,108 | 8/1952 | Ensign | 123/527 |
| 2,882,883 | 4/1959 | Arkuz-Duntov | 123/140 |
| 3,540,419 | 11/1970 | Fox | 123/27 |
| 3,650,255 | 3/1972 | McJones | 123/527 |
| 3,931,798 | 1/1976 | Hoogeboom | 123/120 |
| 4,098,248 | 7/1978 | Todd | 123/120 |
| 4,308,843 | 1/1982 | Garretson | 123/525 |
| 4,453,523 | 6/1984 | Poehlman | 123/527 |
| 4,483,302 | 11/1984 | Mannessen | 123/527 |
| 4,512,304 | 4/1985 | Snyder | 123/344 |
| 4,526,155 | 7/1985 | van den Wildneberg et al. | 123/525 |
| 4,535,728 | 8/1985 | Batchelor | 123/27 |
| 4,537,172 | 8/1985 | Kanehara et al. | 123/527 |
| 4,541,397 | 9/1985 | Young | 123/527 |
| 4,590,896 | 5/1986 | Wissmann et al. | 123/73 |
| 4,632,083 | 12/1986 | Reggiani | 123/527 |
| 4,765,303 | 8/1988 | Jones | 123/527 |
| 4,813,394 | 3/1989 | St. Clair | 123/527 |
| 4,864,991 | 9/1989 | Snyder et al. | 123/344 |
| 4,878,475 | 11/1989 | Birsa | 123/525 |
| 4,886,034 | 12/1989 | Lambert | 123/587 |
| 4,903,721 | 2/1990 | Maier | 137/811 |
| 5,025,758 | 6/1991 | Djurdjevic | 123/527 |
| 5,076,245 | 12/1991 | Jones | 123/527 |
| 5,117,798 | 6/1992 | Nozaki | 123/527 |

FOREIGN PATENT DOCUMENTS 1451316 of 1989 U.S.S.R. .

Primary Examiner—E. Rollins Cross
Assistant Examiner—Erick Solis
Attorney, Agent, or Firm—Brooks & Kushman

[57] ABSTRACT

A fuel system for a single-cylinder internal combustion gas engine comprising a constant gas pressure governor that is situated in a gas supply line extending to the throat of a venturi carburetor, the gas pressure governor including a diaphragm-operated gas valve that responds to changes in static pressure on the upstream side of the venturi of the carburetor, the governor being adapted to compensate for changes in venturi throat pressure due to the opening and the closing of the intake valve for the single-cylinder engine, whereby the governor tends to maintain a uniform air/fuel ratio throughout a large engine speed range.

6 Claims, 6 Drawing Sheets

FUEL SYSTEM AND CONSTANT GAS PRESSURE GOVERNOR FOR A SINGLE-CYLINDER, FOUR-STROKE CYCLE ENGINE

REFERENCE TO RELATED APPLICATION

This is a continuation-in-part of my patent application Ser. No. 911,960, filed Jul. 10, 1992, now abandoned, entitled "Fuel System And Constant Gas Pressure Governor For A Single-Cylinder, Four-Stroke Cycle Engine".

TECHNICAL FIELD

This invention relates generally to internal combustion engines adapted to be used with a residential heat pump. It relates particularly to an improved fuel system and gas pressure governor mechanism for a venturi-type air/fuel carburetor.

BACKGROUND ART

The improvements of this invention relate to natural gas engines, particularly to single-cylinder natural gas engine with a four-stroke cycle. It relates generally to the fuel supply system disclosed in U.S. Pat. No. 4,886,034, which discloses a four-stroke cycle, single-cylinder engine for a residential heat pump wherein the fuel supply manifold communicates with a venturi carburetor having a venturi element and an air bypass passage, the latter being controlled by a throttle valve that is distinct from the speed control throttle valve located in a fuel supply manifold on the downstream side of both the venturi element and the bypass passage. The throttle valve and the bypass passage of the device of the '034 patent compensate for normal tendencies of the air/fuel ratio to vary in magnitude as the engine speed changes. They may be used also as an enrichment mechanism to facilitate engine starting.

Fuel is supplied to the throat of the carburetor of the '034 patent by a means of a supply passage defined in part by a gas pressure governor that includes a diaphragm valve having a diaphragm that is actuated in response to the pressure differential between the throat of the carburetor venturi and the pressure at the air intake of the carburetor. An attempt is made in the control of the '034 patent to maintain a high operating efficiency for the engine by using a pre-programmed microprocessor that responds to sensed engine speed and manifold pressure changes to control the throttle valve and the bypass passage around the carburetor venturi. Pressure pulsations that are due to the opening and the closing of the intake valve for the single cylinder can be offset by appropriately calibrating the microprocessor to compensate for the pulsating pressure of the air that flows through the carburetor throat. Compensating adjustments in the bypass throttle valve are made in response to output signals developed by the microprocessor as the microprocessor responds to the instantaneous data that is measured by the manifold pressure sensor and the engine speed sensor.

Gas governor valves for gas engines are used in other environments such as the auxiliary gas valve system for a diesel engine described in U.S. Pat. No. 3,540,419. The engine described in the '419 patent is a diesel engine that is capable of using gaseous fuel under heavy load conditions, the gaseous fuel being supplied through a fuel flow control system from a liquid petroleum supply tank. The pressure of the gas fuel supplied to the engine intake manifold is regulated by a diaphragm valve that responds to the difference in the pressure of the air on the downstream side of the air filter and the pressure on the gas supply side of a diaphragm actuator for the gas valve. The opposite side of the diaphragm is exposed to the pressure on the downstream side of the air filter. Communication between the downstream side of the air filter and the air side of the diaphragm is established by an orifice valve and by a calibrated flow control orifice, the orifice valve in turn being sensitive to a thermal switch that senses engine load. A shut-off valve is located between the gas supply and the gas valve so that the gas supply may be interrupted when the engine operates in the normal fashion with its liquid diesel fuel injectors.

Attempts have been made in prior art designs to operate single-cylinder engines having a venturi carburetor so that a nearly constant air/fuel ratio is achieved over wide operating ranges of speeds and loads. It has been found, however, that a constant air/fuel ratio cannot readily be obtained because of the unsteady intake air flow associated with single-cylinder operation. This problem is aggravated if an air intake silencer is used because the silencer generates additional pressure pulsations at its natural frequencies. It has been found that the natural frequencies due to the silencer at certain engine speeds may become resonant with respect to engine cyclic frequency.

A typical fuel system having a traditional venturi carburetor may have a solenoid-operated enrichment device to assist cold starting.

BRIEF DESCRIPTION OF THE INVENTION

The improvements of this invention are intended to provide a simplified gas supply mechanism for a natural gas engine adapted especially for residential heat pumps and having one or two cylinders.

It is an object of the invention to provide precise control of the air/fuel ratio regardless of large changes in load and speed for the engine. This objective is consistent with the design strategy for the single-cylinder gas engine combustion chamber described in copending application Ser. No. 917,764. That copending application, which was filed on Jul. 21, 1992, is owned by the assignee of this invention. That design strategy requires fast-burn combustion using a lean air/fuel mixture in the single-cylinder engine combustion chamber which will achieve high efficiency with low $NO_x$ emissions without the necessity for using a catalytic converter.

It is a design objective of my present invention to make it possible to maintain high brake thermal efficiency with minimal changes in air/fuel ratio over a broad range of engine speeds and loads. The improvements of the invention make it possible also to provide an engine with high brake thermal efficiency without seriously deteriorating $NO_x$ emission levels even when air/fuel ratios are richer than the lean limit. This is done by making a controlled balance between engine efficiency and a desired emissions level as the engine is allowed to operate consistently at the desired air/fuel ratio.

Our improved fuel system includes a venturi-type single-throat carburetor mechanism. It does not include a complex bypass throttle valve and it does not require a microprocessor-based controller for the throttle valve as described the '034 patent. It includes a diaphragm-type gas governor for controlling the supply of gas to the throat of the venturi of the carburetor.

The venturi action of the carburetor of my improved fuel system provides a relatively constant air/fuel ratio that is relatively independent of changes in flow through the venturi and thus is relatively insensitive to speed changes throughout a significant range of engine speeds.

The venturi carburetor maintains the fuel supply pressure at the carburetor inlet and the air pressure at the venturi intake in balance. If the air filter at the intake side of the venturi becomes dirty, air pressure at the venturi intake decreases, thus tending to upset the balance.

The governor of this invention includes a diaphragm valve having a diaphragm valve actuator, one side of which is connected to the downstream side of the air filter, thus providing a reference pressure. The diaphragm valve receives the effective pressure at the inlet of the venturi.

Because the engine in a preferred embodiment of the invention has a single cylinder, strong pressure pulsations are generated in the air flow stream. If the fuel pressure is held constant, those pulsations would result in wide variations in air/fuel ratio as engine speed or load change. That, in turn, would adversely affect efficiency, emissions and running stability. The improved governor of this invention is specifically tailored to minimize those pressure variations and to keep the air/fuel ratio nearly constant by substantially compensating for the pressure pulsations in the air stream.

One side of the diaphragm actuator for the gas valve of my governor is connected to a regulated supply of gas. The opposite side of the diaphragm actuator is connected to the engine air inlet downstream of the filter. The diaphragm is slightly loaded with a valve spring which creates a force that opposes the differential forces tending to admit gas.

A pressure balance line connects the air side of the diaphragm actuator to the engine air intake on the downstream side of the filter. In a gas governor of the kind disclosed in prior art teachings, the compensation for air pressure changes can occur only if they happen slowly. Such compensation might be made with prior art systems, for example, to maintain a constant air/fuel ratio even though the air intake may be plugged due to contaminants.

Such prior art systems may be successfully used also in multiple-cylinder engines where the intake pulses are smoothed out in the manifold, thus eliminating the large pressure pulsations that are present in a single-cylinder engine of the kind used, for example, with residential heat pumps. The dynamic forces in such prior art systems used with multiple-cylinder engines do not require a dynamic response to overcome changes in the differential pressure forces acting on the diaphragm valve.

The improvements of my invention are capable of compensating for pressure pulsations in the air/fuel supply that are particularly characteristic of a gas engine with one or two cylinders. It compensates also for the significant dynamic forces that normally tend to occur.

With the improved governor of the present invention, the governor dynamics problem is minimized by reducing the time response of the fuel pressure control system so that the fuel pressure at the fuel nozzle approximately equals the air pressure at the venturi inlet throughout the engine cycle. Short, large diameter balance lines and fuel feed lines are used to ensure immediate response of the governor to changes in air pressure at the inlet side of the venturi due to pulsations that are developed in a single-cylinder engine upon opening and closing of the intake valve for the engine.

A pressure governor bias spring is used to establish a force on the diaphragm actuator for the governor that is sufficient only to balance the force on the valve due to the fuel supply pressure. This eliminates the tendency that otherwise would exist for a significant air flow from the carburetor back into the pressure governor between intake pulses.

The invention uses a close-coupled governor in a fuel system for maintaining a constant air/fuel ratio throughout a range of engine speeds and loads.

PARTICULAR DESCRIPTION OF THE INVENTION

Under steady flow conditions, the venturi can deliver a constant air/fuel ratio over a broad range of air flow. The mass flow rate of air can be determined from the following orifice equation for compressible flow (assuming negligible entrance velocity).

$$\dot{M}_A = C_D A_t \left\{ 2g \frac{K}{K-1} P_a \gamma_a \left[ \left(\frac{P_t}{P_a}\right)^{2/k} - \left(\frac{P_t}{P_a}\right)^{K+1/K} \right] \right\}^{1/2}$$

where
$M_A$ = mass flow rate of air
$C_D$ = orifice coefficient
$A_t$ = throat area g = gravitational acceleration
K = specific heat ratio
$P_t$ = pressure in venturi throat
$P_a$ = air pressure at venturi entrance
$\gamma_a$ = air density at venturi entrance The equation can be approximated by a simpler relationship:

$$\dot{M}_A = C_1 [P_A - P_t]^{\frac{1}{2}}$$

where $C_1$ is a proportionality factor that depends on the pressure ratio $P_t/P_A$. The mass fuel flow rate can be determined from a similar equation:

$$\dot{M}_F = C_2 [P_F - P_t]^{\frac{1}{2}}$$

where
$M_F$ = mass flow rate of fuel
$C_2$ = proportionality factor (function of $P_t/P_F$).

It can be seen from the foregoing equations that, if the fuel pressure $P_F$ is kept equal to the inlet air pressure $P_A$, then the ratio of air flow to fuel flow will remain very nearly constant and independent of the quantity of air flow.

It is important, for accurate air/fuel ratio control, to minimize the difference between fuel and air pressures entering the carburetor. To do so, a pressure regulator, also called a gas pressure governor or zero pressure governor, is employed as shown schematically in FIGS. 4 and 4A. Fuel at a low, positive pressure (typically 3" H2O) is supplied to the pressure governor inlet. A diaphragm and valve mechanism ensure that the fuel pressure in the lower governor chamber 94 approximately equals the pressure in the upper reference chamber 96. By using a light spring (ideally a spring with a force just sufficient to balance the force on the inlet valve due to fuel supply pressure) and a large-diameter, lightweight diaphragm, as shown at 98, the pressure differential across the diaphragm can be kept very small.

When a filter 84 is used for the inlet air, there will be some pressure drop across the filter depending on its state of cleanliness. It is common practice to maintain the fuel pressure nearly equivalent to the air pressure downstream of the filter by use of a balance line 110. With this configuration, the reference chamber of the pressure governor is connected to the intake air stream by the balance line. If the air velocity in the inlet pipe is significant, the balance line should point, as shown, into the air stream to sense total (static plus dynamic) air pressure. For steady or nearly steady air flow, typical of multi-cylinder engine operations, this configuration is adequate for good air/fuel ratio control.

Figure 8:
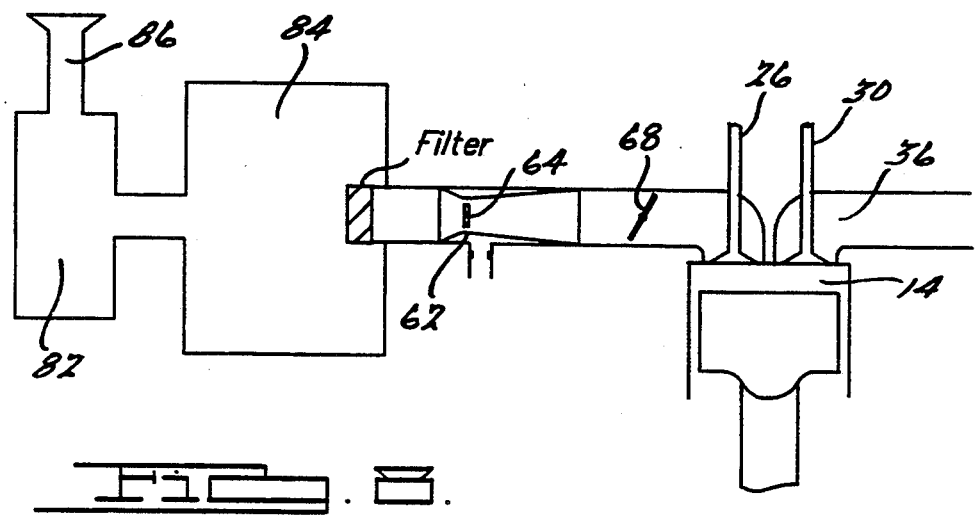
FIG. 8 is a schematic representation of the air/fuel induction system for the engine of FIG. 1.

The air intake system consists of a combined air filter and silencer with a hose connection to the carburetor, which is mounted directly to the engine intake port. The silencer is comprised of two expansion chambers connected in series, as shown conceptually in FIG. 8.

Figure 12:
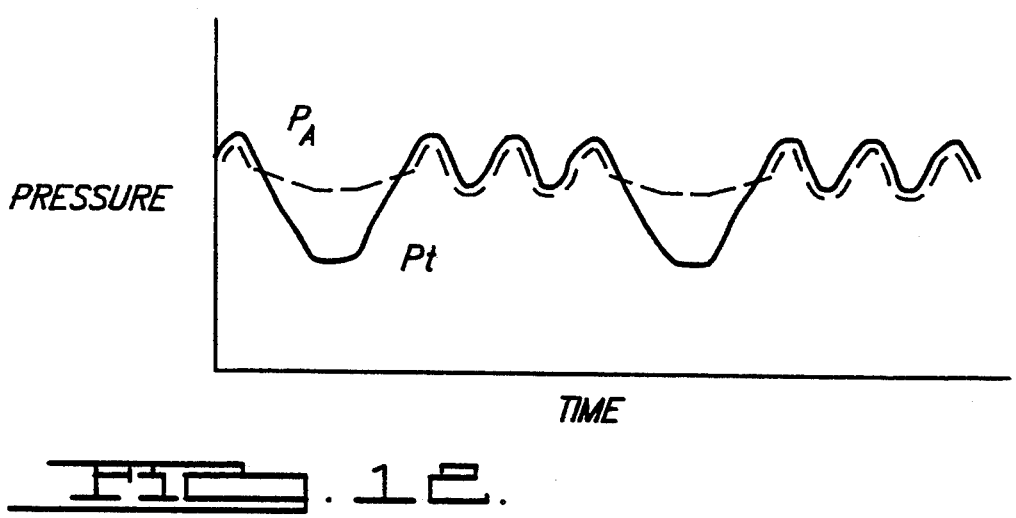
FIG. 12 is a plot of the pressures at the venturi entrance and at the venturi throat over a two-stroke cycle time.

At a given point in the air intake system, the pressure varies in a periodic manner with engine cyclic frequency. FIG. 12 shows a typical plot of pressures at the entrance to the venturi ($P_A$) and at the throat ($P_t$) over two engine cycles. As expected, there is a large depression in throat pressure, and a smaller depression in entrance pressure, during the intake stroke. In between intake strokes, the two pressures oscillate synchronously at the natural frequency of the intake system. The pressure wave, furthermore, may not be dampened out between intake strokes. Also, the phase of the pressure waves at the start of the intake stroke will vary with engine speed.

If the fuel pressure is kept constant over the engine cycle, there will be significant flow through the fuel orifice 46 in both directions between intake strokes. Since the flow through the orifice is proportional to the square root of the pressure difference across the orifice, these flows can be a large fraction of the flow that occurs during the intake stroke. As the engine load and speed change, the amplitude of the pressure wave and the phase of the pressure wave at the start of the intake stroke will vary. The result will be large fluctuations in air/fuel ratio with engine speed and load.

The improvements of my invention make it possible to achieve relatively constant air/fuel ratio operation notwithstanding the tendency of the engine to develop pressure pulsations during the opening and closing of the intake valves. During the intake stroke, the fuel pressure in the governor normally is pulled down below atmospheric inlet pressure. After the intake stroke, the governor pressure tends to overshoot, as will be explained subsequently with reference to the FIGS. 5 and 5A. This causes fuel pressure to exceed air inlet pressure for a small part of a engine cycle. It is an objective of the present invention to minimize these deviations and thereby minimize the adverse effect on the mixture ratio over a wide range of air flow.

Figures 1, 2:
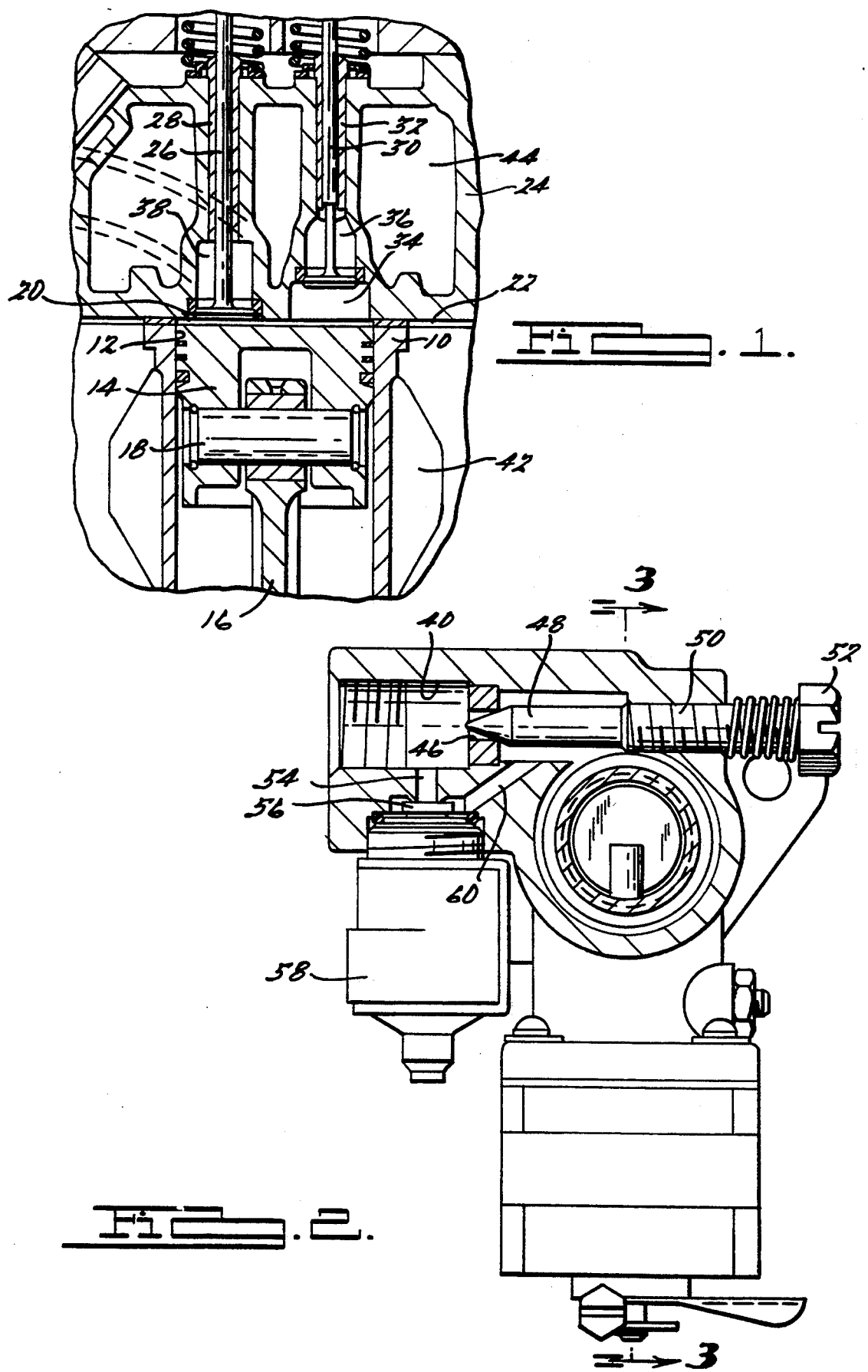
FIG. 1 is a cross-sectional view of a single-cylinder engine, particularly the upper portion of the cylinder housing and the lower portion of the cylinder head.
FIG. 2 is a cross-sectional view showing an air/fuel carburetor throttle body.

Referring to FIG. 1, the engine cylinder shown at 10 is part of an engine cylinder block casting. It has a cylinder bore 12 which receives piston 14. A piston rod 16 is connected to the piston by a wrist pin 18.

The piston 14 shown in FIG. 1 is at its top dead center position. When it is so positioned, the top of the cylinder 20 generally is coplanar with respect to the upper surface 22 of the cylinder housing.

A cylinder head 24 is bolted to the surface 22 and a calibrated clearance is provided at the interface of the cylinder head and the surface 22.

Intake valve 26 is situated in a valve sleeve 28 arranged in the cylinder head, the latter being a casting.

An exhaust valve 30 is slidably situated in valve sleeve 32. It controls the exhaust of combustion products from combustion chamber 34 to the exhaust passage 36.

Cylinder head 24 is provided with an intake port 38 which communicates with an intake passage (not shown) which is part of an air inlet passage 40 of the carburetor throttle body shown in FIG. 2.

Cylinder casting 10 is provided with coolant passages 42, and cylinder head 24 is provided with coolant passages 44. Coolant fluid is circulated through the coolant passages 42 and 44.

Intake valve 26 is actuated by a camshaft in the usual fashion. It opens communication between the combustion chamber and the air and fuel supply passage on the downstream side of the throttle for the carburetor shown in FIG. 3. Valve 26 closes during the compression stroke of the piston in known fashion.

The gas intake passage for the fuel system communicates with passage 40 as seen in FIG. 2. Calibrated gas flow orifice 46 is located in the gas intake flow path. The effective size of the orifice 46 is controlled by an adjustable needle valve 48 which is comprised of a threaded stem 50 with an external adjustment head 52.

A fuel enrichment orifice 54 is opened and closed by a solenoid operated enrichment valve element 56. A solenoid operator 58 for the solenoid valve maintains the valve 56 in an open position when fuel enrichment is desired. For example, during starting valve 56 opens enrichment passage 54, thereby establishing communication with bypass gas passage 60. This causes the air/fuel ratio to change from lean to stoichiometric.

Figure 3:
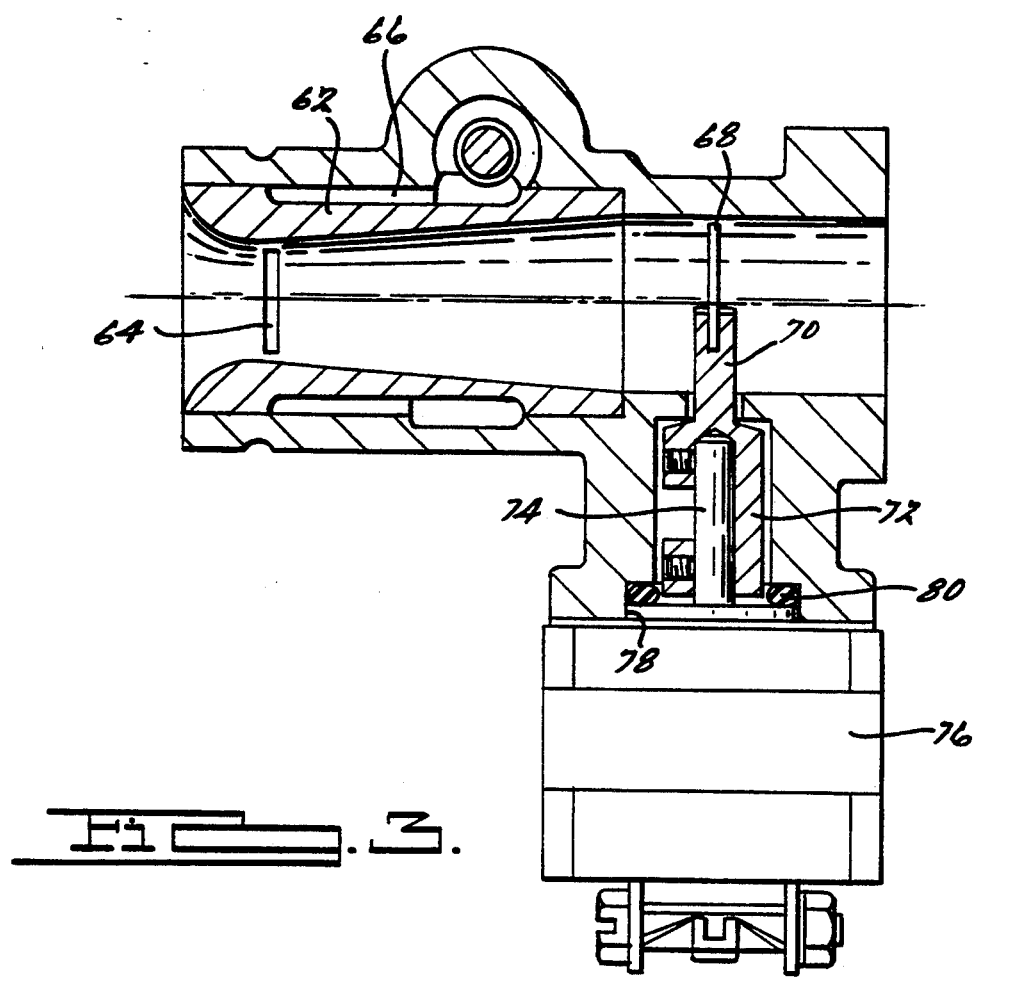
FIG. 3 is a cross-sectional view taken along the plane of section line 3—3 of FIG. 2.

Gas entering the passage 40 is distributed to the throat of the venturi element shown at 62 in FIG. 3. The communication between passage 40 and the throat of the venturi element 62 includes gas supply ports 64 which communicates with annular passage 66 which in turn communicates with the downstream side of the orifice 46.

An adjustable throttle plate 68 is located on the downstream side of the orifice element 62. When it is positioned as shown, it effectively closes the flow path through the venturi. Throttle plate 68, shown in its end view in FIG. 3, is mounted on throttle shaft 70, which is connected to or is formed integrally with a stepper motor armature sleeve shaft 72. An armature 74 for a stepper motor mechanism 76 is received in the sleeve 72. Stepper motor 76 secured within a mounting opening 78, and an O-ring seal 80 isolates the armature shaft 70 from the stepper motor. The throttle and stepper motor arrangement, together with the carburetor assembly itself, is described in copending application Ser. No. 914,360, filed Jul. 14, 1992. That copending application is assigned to the assignee of this invention.

Figure 4:
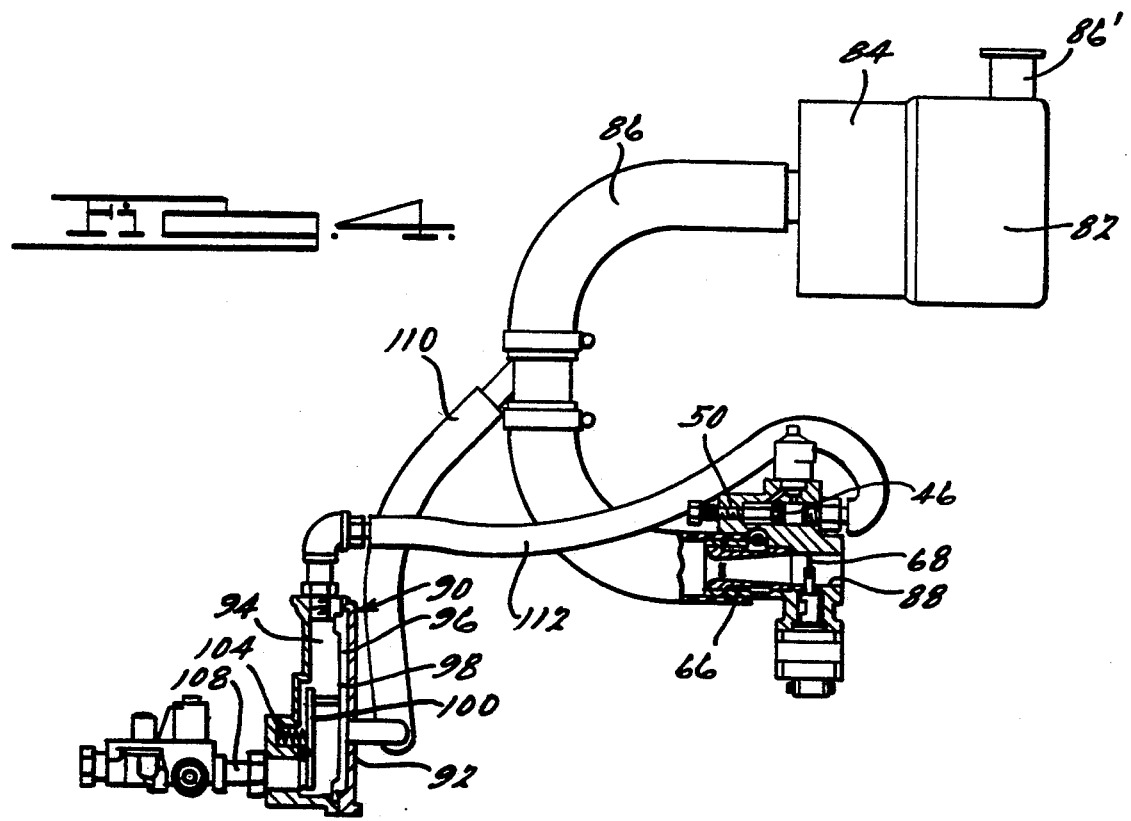
FIG. 4 is a schematic representation of the venturi carburetor and a gas pressure governor for the fuel system of my invention.

Shown in FIG. 4 is the fuel system of my invention including the carburetor and the gas pressure governor. In FIG. 4, numeral 82 designates an air filter assembly and numeral 84 designates a noise silencer. The silencer and the filter assembly are formed as one unit located at the air intake end 86' of an air induction passage 86.

The fuel mixture intake port of the cylinder head seen in FIG. 1 communicates with the outlet end 88 of the induction passage. Throttle 68 controls the flow of air/fuel mixture through the passage 88.

All of the air induced through the passage 86 enters the inlet side of the venturi element 62.

Figure 4A:
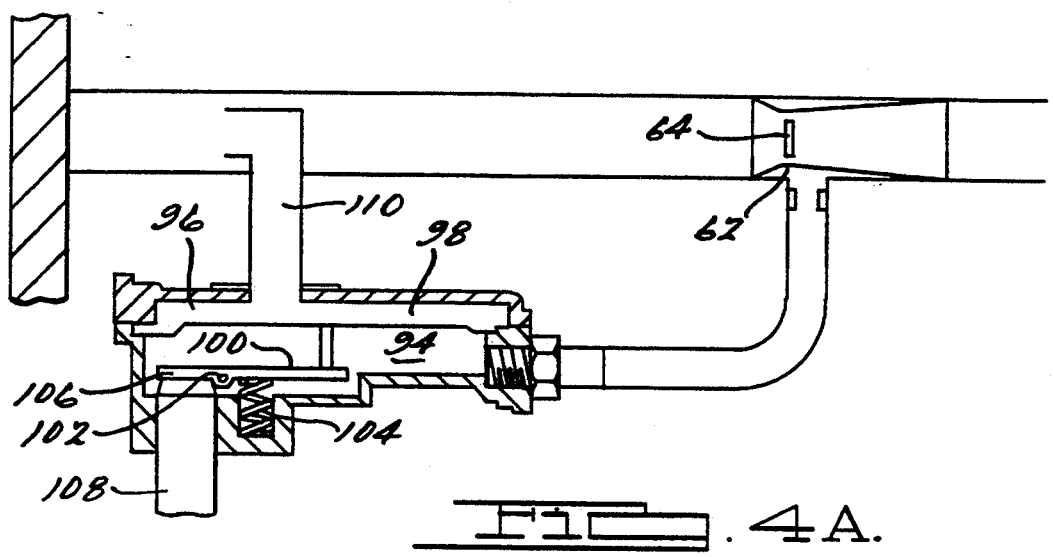
FIG. 4A is an enlargement of the gas pressure governor of FIG. 4.

A gas pressure governor assembly 90 comprises a housing 92 having a gas chamber 94 and an intake air chamber 96. The chambers 94 and 96 are separated by a flexible diaphragm 98 as seen in FIGS. 4 and 4A. Diaphragm 98 is connected to one end of a valve operating lever 100 which is pivoted on a fulcrum at 102. A valve bias spring 104 urges the lever 100 in a clockwise direction as viewed in FIG. 4. A valve member 106 registers with the fuel supply inlet opening of gas fuel passage 108. The spring 104 produces a bias torque on the lever 100 which tends normally to close the valve 106. The spring force due to the pressure differential in chambers 94 and 96 and the pressure differential across valve 106 operate the valve 106.

The air chamber 96 is in open communication with the passage 86 on the upstream side of the venturi element 62 and on the downstream side of the filter assembly 82. This communication is established by a balance line 110 which is an open passage of reduced length and with minimal flow restriction.

Gas chamber 94 communicates with the inlet side of orifice 46 through passage 112 which communicates with the passage 40 seen in FIG. 2. Gas flow passage 112 is also designed for minimal flow restriction.

Figure 5:
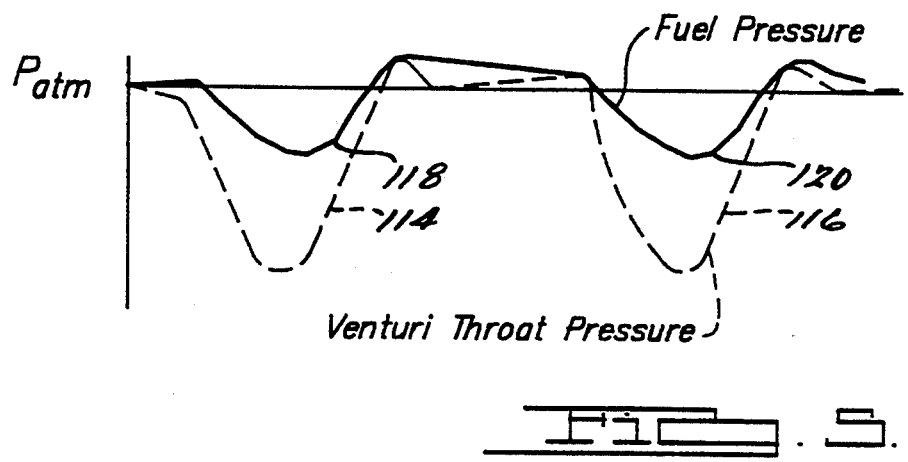
FIG. 5 is a plot of the venturi throat pressure and the fuel pressure for the fuel system of my invention for an engine without gas pressure dynamic compensation.
Figure 5A:
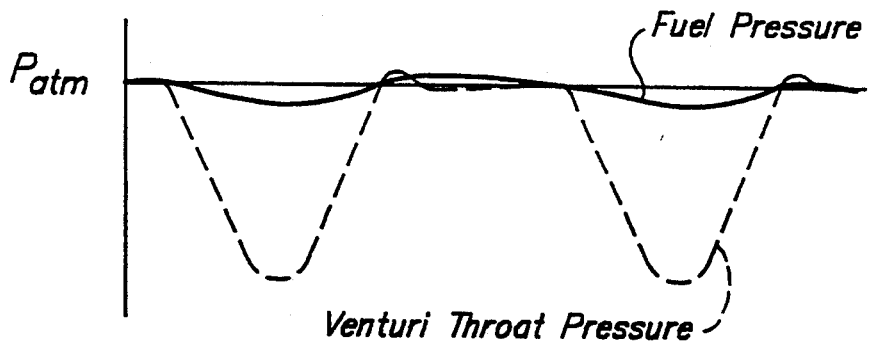
FIG. 5A is a plot similar to the plot of FIG. 5 wherein the gas pressure variation is reduced in accordance with the teachings of my invention.

In FIG. 5, there is shown a plot of the venturi throat pressure versus time for a given operating speed of the engine. The venturi throat pressure, as seen in FIG. 5, has negative pressure pulsations as seen at 114 and 116. These are separated by a space that corresponds to the period in which the intake valve is closed during the engine cycle. The pressure at the venturi throat is approximately equal to the static pressure at the venturi entrance between intake valve openings.

Superimposed on the graph of FIG. 5 is a plot 118 and a plot 120 in synchronism with the negative venturi throat pressure plots 114 and 116, respectively. When the pressure is reduced at the intake side of the venturi throat, the balance line communicates that pressure change to the governor, thereby reducing the static pressure in the air chamber 96. This upsets the force balance on the diaphragm 98 and increases the closure force on the valve 106, thereby reducing the fuel supply rate to the gas chamber 94 and increasing the volume of gas chamber 94. This has the effect of reducing the fuel pressure at the instant of a reduction in venturi throat pressure due to the pulsations caused by the intake valve opening and closing. That effects a simultaneous change in the pressures of the gas and the air to result in a reduction in the change of air/fuel ratio resulting from transient pressure changes in the passage 86.

The balance line 110 and the gas line 112 are designed to provide close proximity of the air chamber 96 and the inlet side of the venturi element and close proximity of the gas chamber 94 and the throat of the venturi. It is designed also to provide nearly an immediate response of the air pressure in air chamber 96 to a change in pressure in the passage 86. Similarly, by minimizing the flow restriction in gas line 112, the gas pressure at orifice 46 exhibits a nearly immediate response to pressure changes in gas chamber 94. The light weight of the diaphragm 98 and valve mechanism 100 ensure that the pressures in air chamber 96 and gas chamber 94 remain essentially equal.

By requiring all of the intake air to pass through the venturi, rather than attempting to control air/fuel ratio by the use of an auxiliary passage as in my prior art patent '034, the air/fuel ratio may be regulated without the necessity for complex microprocessor fuel controllers and a secondary throttle valve together with the speed and load sensors required to develop data from a microprocessor controller.

The fuel system has been designed to compensate for pressure pulsations in the air intake by forcing the fuel pressure to dynamically track the pressure pulsations. In other words, the fuel pressure at the entrance to the carburetor gas orifice 46 is maintained approximately equal to the air pressure at the venturi entrance despite fluctuations in the air pressure. This is achieved by providing for rapid dynamic response.

The key elements that develop the fuel pressure dynamic response are the balance line, the pressure governor volume, and the fuel line. The governor diaphragm 98 is of sufficiently low mass to have insignificant impact on the overall dynamic response.

At the low pressure amplitudes that typically occur between intake strokes, the damping due to the fuel orifice is very light. The simplified dynamic model of FIG. 9 illustrates reasonable approximation of the dynamic response.

Figure 9:
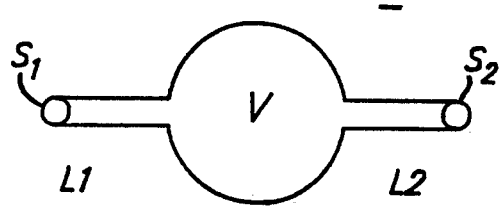
FIGS. 9 and 10 show a simplified model of the governor gas dynamics.

In FIG. 9, the gas feed line cross-sectional area is labeled $S_2$ and its length is labeled $L_2$. The area of the balance line cross-section is $S_1$ and its length is $L_1$. The mass of a body of air in the balance line is $M_1$ and the mass of a body of gas in the gas feed line is $M_2$. V is the volume in the pressure governor.

If we assume the balance line and gas line to have equivalent diameters and lengths, the natural frequency can be written:

$$f_o = \frac{1}{2\pi}\left[\frac{2c^2 S}{VL}\right]^{1/2}$$

where c is the sonic velocity. To obtain rapid dynamic response, a high natural frequency is desired, which implies large diameter and short length for the balance and gas lines and small pressure governor volume. In practice, the governor volume is determined in part by the need for a fairly large diaphragm. The pressure governor used with a preferred embodiment of the engine has a volume of 20 in³.

Figure 10:
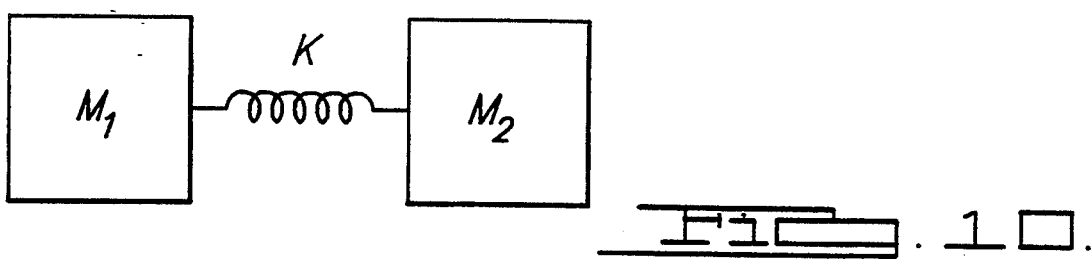

FIGS. 9 and 10 together show an analytic equivalent model of the relationship of the dynamic factors. K in FIG. 10 is the system equivalent spring constant. Thus, $$M = \rho L/S$$
and
$$K = \frac{\rho c^2}{V}$$

where $\rho$ is the air density.

Figure 11:
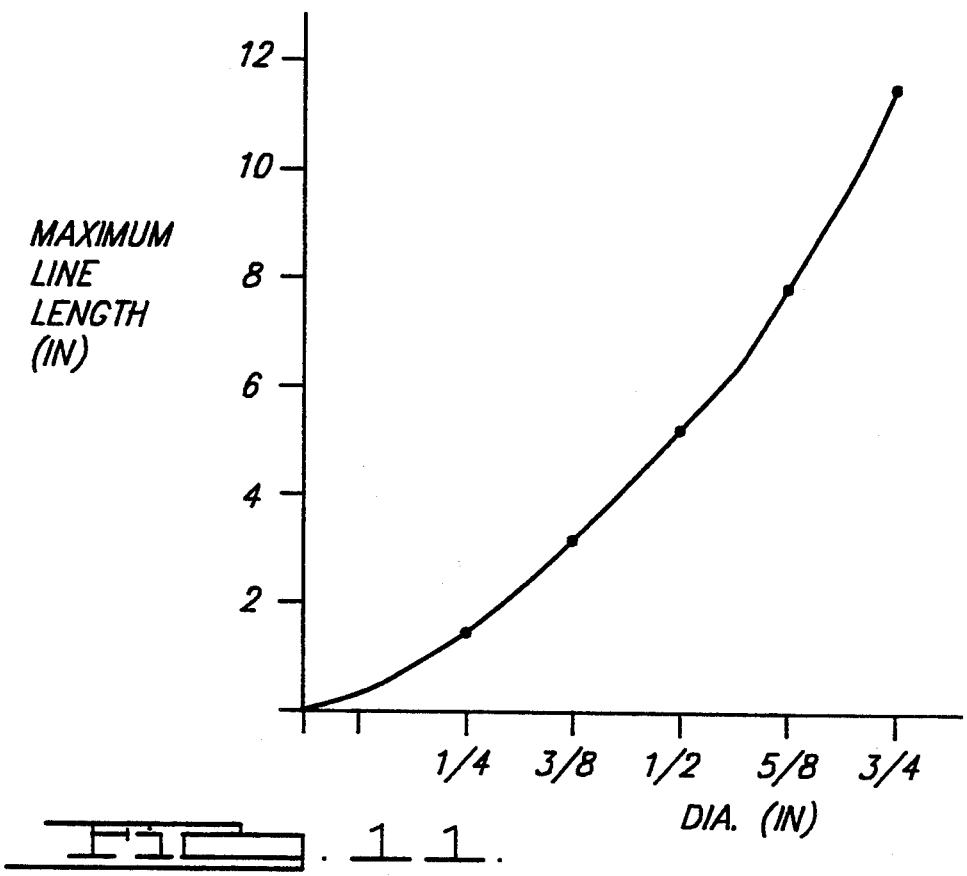
FIG. 11 shows a plot of the optimum length and diameter of the balance line and fuel line shown in FIGS. 4 and 4A.

It was found experimentally that good dynamic performance is obtained when the transient response time is limited to about 1.7 msec, which corresponds to a delay of 30-degree crank angle at a speed of 3000 RPM. Using the approximation that the transient response time is given by the equation:

$$t_R = 4/f_o,$$

the diameter to length relationship for the balance line should be:

$$\frac{d^2}{L} = \frac{2V}{\pi}\left[\frac{2\pi f_o}{c}\right]^2 \geq 0.04$$

where d is the diameter of the balance and gas lines. FIG. 11 is a plot of maximum line lengths versus diameter. In a preferred embodiment of the invention, ⅜-inch-diameter lines are used, so the line lengths are kept to about 8 inches. The ratio d²/L will be at least 0.04.

An additional dynamic effect with significant impact on air/fuel ratio control is the overshoot of fuel pressure just after the intake stroke. This effect can be explained with reference to FIGS. 5 and 5A. During the intake stroke, fuel is withdrawn from the pressure governor, reducing the fuel pressure in the governor. The governor diaphragm is displaced, increasing the fuel valve opening and the fuel inlet flow. In addition, the reduced pressure causes air to flow into the reference chamber 96 which helps to limit the pull down in fuel pressure. After completion of the intake stroke, an equivalent quantity of air is pushed back out of the reference chamber. To do so, the fuel and reference pressures in the governor must swing higher than the pressure at the venturi entrance. Thus, the fuel pressure falls below venturi entrance pressure during the intake stroke and moves above venturi entrance pressure after the intake stroke. The net effect of these fuel pressure fluctuations is enrichment of the mixture. This is due to the nonlinear relationship between fuel orifice flow and pressure difference. In other words, the small fuel pressure fluctuation has very little effect when the large venturi throat depression is present. The net fuel enrichment will be greater for greater fuel flows associated with higher engine loads.

The fuel pressure overshoot shown in FIG. 5 can be minimized by minimizing the flow restriction between the reference chamber 96 and the venturi entrance by using a large diameter, short length balance line. It was found experimentally that the balance and fuel line parameters of ⅜ inch diameter and 8 inch length, determined from the analysis described above, keep the fuel overshoot effect within acceptable limits.

Figure 6:
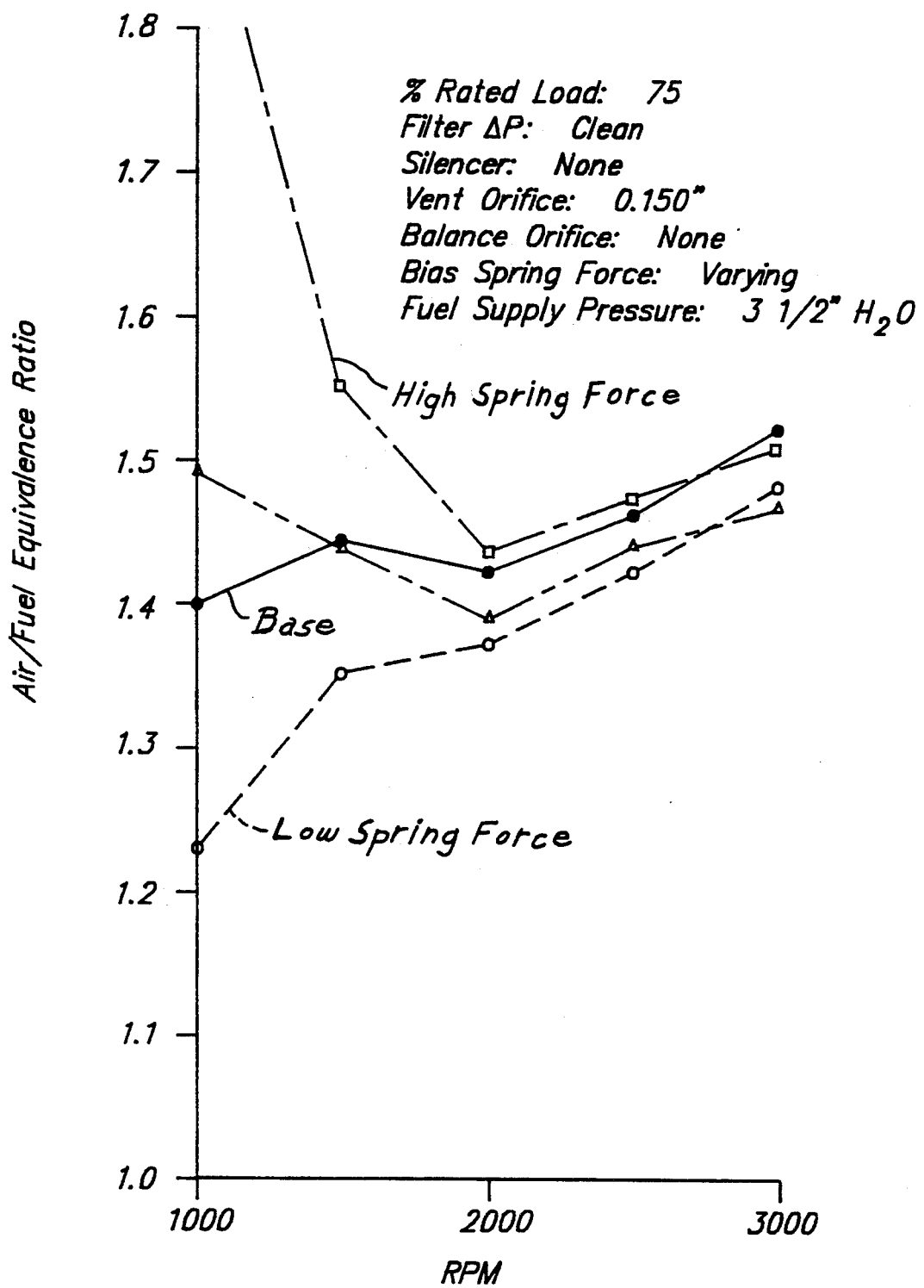
FIG. 6 is a chart showing the relationship between engine speed and air/fuel equivalence ratio, which is the ratio of the actual air/fuel ratio divided by the air/fuel required for stoichiometric operation.

I have shown in FIG. 6 the relationship between air/fuel equivalence ratio and engine RPM with various spring forces. The equivalence ratio for purposes of the plot of FIG. 6 is the actual air/fuel ratio divided by the stoichiometric air/fuel ratio.

The bias spring closes the gas valve when the engine is not running and creating a vacuum. The force of the spring thus results in a pressure differential across the diaphragm. The spring therefore, is desirably very light. In a working embodiment of the invention, the spring force might by 0.075 pounds at its valve closed position and about 0.10 pounds when the valve is open. The spring force is partially opposed by fuel supply pressure, which might be about 3.5 inches of water acting against the valve area. The effective gas pressure thus produced creates a pressure differential of about 0.0014 psi across the diaphragm.

The venturi depression represented in FIG. 5 might be in a typical working embodiment about 0.15 psi at 1000 RPM and 75 percent rated load. The pressure of the spring and the resulting pressure differential across the diaphragm are sufficient to produce a flow rate of about 0.077 cubic feet per minute of air from the carburetor back toward the governor between intake strokes. The average fuel flow rate is about 0.22 cubic feet per minute at 1000 engine RPM and 75 percent load. The reverse flow between intake strokes is sufficient to increase the air/fuel equivalence ratio from 1.4 to 1.9 at this operating point.

The bias of the spring has an effect on the equivalence ratio at each speed, but the influence is greater at lower speeds than it is at higher speeds as shown in FIG. 6. It causes the mixture to be leaner at lower engine speeds. The adverse effect of the governor spring is minimized by providing a spring force just sufficient to balance the force due to the differential pressure across gas valve 106. In a preferred embodiment of the invention, the spring force is 0.018 lbs.

Figure 7:
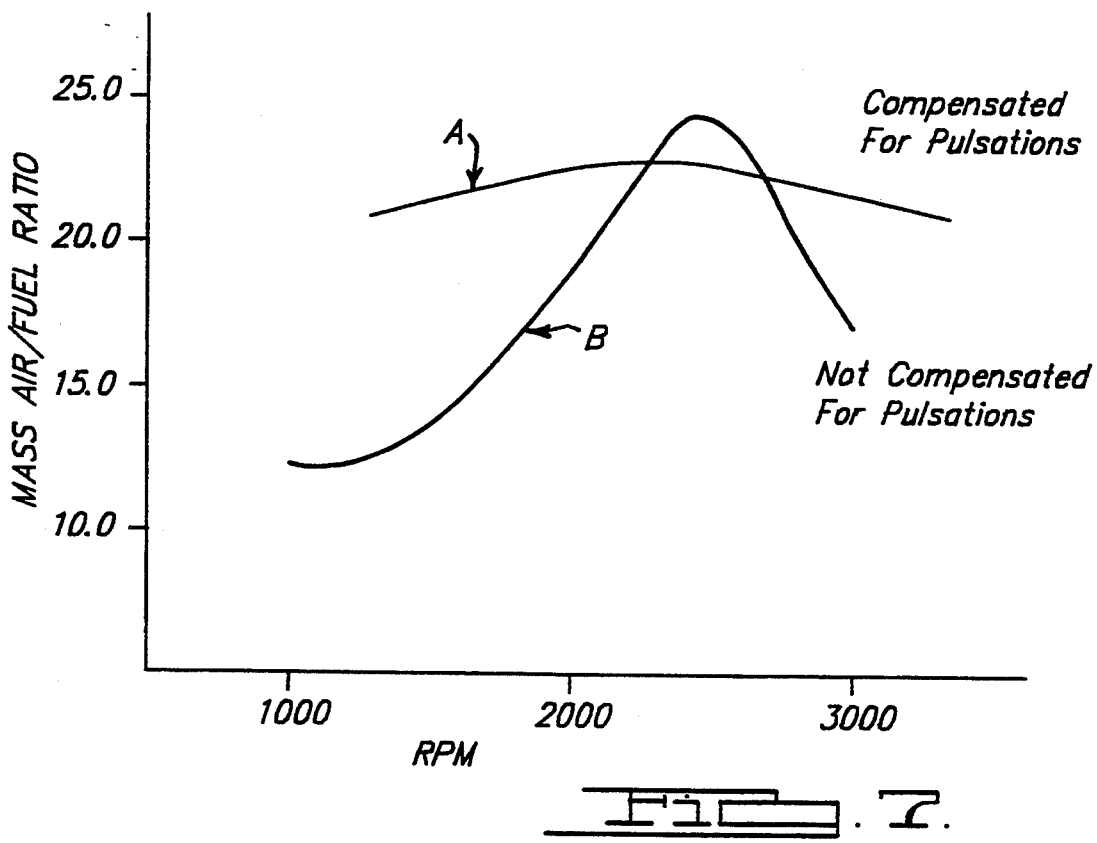
FIG. 7 is a chart showing the relationship between the mass air/fuel ratio and the engine speed.

FIG. 7 shows a typical mass air/fuel ratio plot for various engine speeds. Curve A is the relationship obtained using the improved fuel system of my invention and curve B shows, in contrast, the corresponding relationship in a fuel system that has no compensation for pulses. The plot of FIG. 7 at A is relatively constant whereas a sharp variation in mass air/fuel ratio is obtained in a non-compensated system. The maximum air/fuel ratio occurs at about 2500 RPM in a non-compensated system. At both higher and lower speeds, the ratio for a non-compensated system is much too low for optimum efficiency and performance.

Having described a preferred embodiment of my invention, what I claim and desire to secure by United States Letters Patent is:

1. A gas fuel carburetor assembly for an internal combustion gas engine with one or two cylinders comprising an air induction passage and a fuel supply passage;

a gas pressure governor means for regulating the supply pressure for said fuel supply passage;

said governor having a gas chamber and an air reference pressure chamber, said fuel supply passage communicating with said gas chamber;

a venturi member in said induction passage, gas ports in said venturi member communicating with a throat portion of said venturi member, a calibrated gas passage means having a minimal flow restriction for connecting said gas chamber with said gas ports;

a gas valve member registering with said fuel supply passage, spring means for normally urging said gas valve member to a gas supply passage means closing position;

a flexible diaphragm separating said reference pressure chamber and said gas chamber;

a gas valve operator element connecting said valve member and said diaphragm; and a balance line connecting said reference pressure chamber and said induction passage on the upstream side of said venturi member whereby said induction passage and said reference pressure chamber are in close, unrestricted flow relationship whereby transient pressure changes in said induction passage develop an immediate response by said governor to maintain a desired target air/fuel ratio for a wide range of engine speeds and loads, said balance line having a diameter and length relationship such that $d^2/L \geq 0.04$ inches where $d=$balance line internal diameter and $L=$length from said induction passage to said reference air pressure chamber.

2. The combination as set forth in claim 1 wherein said gas passage means is defined in part by a gas flow controlling orifice valve means for determining the rate of delivery of gas to said venturi member.

3. A gas fuel control system for a single-cylinder internal combustion gas engine having a single cylinder with an air/fuel intake valve;

an air induction passage communicating with said air/fuel intake valve, said induction passage delivering air to said intake valve on each intake stroke of said engine;

a gas carburetor comprising a venturi with a throat situated in and defining said induction passage and adapted to accommodate the intake air flow to said intake valve;

a gas passage communicating with said venturi throat;

a gas flow regulating valve means in said gas passage for controlling the rate of delivery of gas fuel to said venturi throat;

a gas pressure governor, said governor having a gas chamber and a reference air pressure chamber separated by a flexible diaphragm;

a gas supply valve, a gas fuel supply line communicating with said gas supply valve;

means for opening and closing said gas supply valve to provide controlled communication between said gas chamber and said supply line;

means for connecting said diaphragm to said gas supply valve for actuating said gas supply valve in response to pressure differential changes across said diaphragm;

a calibrated spring means acting on said gas supply valve for normally closing said gas supply valve; and an air balance line for delivering a reference air pressure from said induction passage on the upstream side of said venturi throat to said reference air pressure chamber, said air balance line being of minimal length and providing a change in reference pressure in said reference air pressure chamber thereby effecting an immediate response of said governor to transient pressure changes in said air induction passage due to irregular fuel and air delivery to said intake valve upon opening and closing of said intake valve, said balance line having a diameter and length relationship such that $d^2/L \geq 0.04$ inches where $d=$balance line internal diameter and $L=$length from said induction passage to said reference air pressure chamber.

4. The combination as set forth in claim 3 wherein said supply passage is defined by a gas flow controlling orifice valve means for determining the rate of delivery of gas to said venturi throat.

5. The combination as set forth in claim 3 wherein said spring means acts on said gas valve with a force not in excess of the force necessary to balance gas and air pressure forces in said diaphragm.

6. The combination as set forth in claim 5 wherein said balance line and said gas passage each has a diameter and length relationship such that $d^2/L \geq 0.04$ inches where $d=$internal diameter and $L=$length from said induction passage to said reference air pressure chamber.

* * * * *